Figure 1:
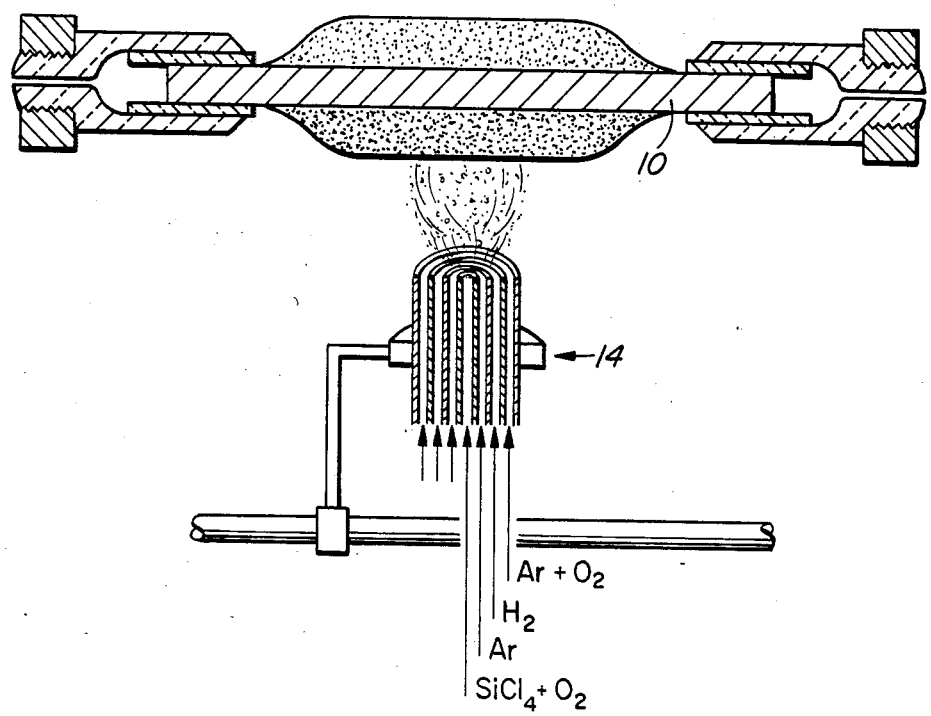

United States Patent [19]
Abe

[11] Patent Number: 4,648,891
[45] Date of Patent: Mar. 10, 1987

[54] OPTICAL FIBER

[75] Inventor: Koichi Abe, Ottawa, Canada

[73] Assignee: Northern Telecom Limited, Montreal, Canada

[21] Appl. No.: 721,104

[22] Filed: Apr. 8, 1985

[30] Foreign Application Priority Data

Sep. 17, 1984 [CA] Canada .................................. 463378

[51] Int. Cl.[4] .................... C03B 37/018; C03B 37/027
[52] U.S. Cl. ..................................... 65/3.12; 65/3.11; 65/DIG. 16
[58] Field of Search ...................... 65/3.11, 3.12, 3.15, 65/18.2, DIG. 16

[56] References Cited

U.S. PATENT DOCUMENTS

| 4,235,615 | 11/1980 | Rau | 65/DIG. 16 |
| 4,289,517 | 9/1981 | Bailey | 65/18.2 X |

FOREIGN PATENT DOCUMENTS

| 3230199 | 2/1984 | Fed. Rep. of Germany | 65/DIG. 16 |
| 55-67533 | 5/1980 | Japan | 65/DIG. 16 |
| 56-84328 | 7/1981 | Japan | 65/DIG. 16 |
| 8208146 | 12/1983 | Japan | 65/DIG. 16 |
| 2037273 | 7/1980 | United Kingdom | 65/DIG. 16 |

OTHER PUBLICATIONS

Suda et al; Electronics Letters (10/9/1980), vol. 16, No. 21, pp. 802-803.

Primary Examiner—Kenneth M. Schor
Attorney, Agent, or Firm—Schwartz, Jeffery, Schwaab, Mack, Blumenthal & Evans

[57] ABSTRACT

A tubular porous silica preform is made by depositing particulate silica on a mandrel from which the preform is subsequently removed. A solid cylindrical porous silica preform is made by depositing particulate silica on an end surface of a support body. The porous preforms are then dried and the tubular preform is heated in a fluorine containing atmosphere to introduce a fluorine dopant into the silica. The rod preform is then placed inside the tubular preform and the two preforms are further dried in a chlorine atmosphere to remove residual moisture. The dual preforms are then heated in a zone sintering furnace to consolidate and collapse the porous material of the rod and tubular preforms into a transparent fused silica rod. The composite preform obtained is heated and dielectric optical waveguide drawn from it, the waveguide having a pure silica or doped silica core derived from the rod preform and a fluorine doped silica cladding derived from the tubular preform.

7 Claims, 4 Drawing Figures

OPTICAL FIBER

The invention relates to a method for manufacturing an optical waveguide. It has particular application to the manufacture of an optical waveguide having a fluorine doped silica cladding and a pure or doped silica core.

An optical waveguide having a fluorine doped silica cladding is described in U.S. Pat. No. 4,082,420 (Shiraishi et al). The optical waveguide is made by a flame hydrolysis method in which silicon tetrachloride and silicon tetrafluoride are fed to an oxygen-hydrogen burner to form a soot which is deposited onto the surface of a pure silica rod. The rod is then heated to consolidate the soot into a composite glass preform and fiber is drawn from the preform.

Using the flame hydrolysis method, it has proven difficult to entrain sufficient fluorine into the deposited silica. The fluorine lowers the refractive index of the silica but the dopant content must be sufficient to lower the index from about 1.4585, being that of pure silica, to about 1.4530 in order that a fiber having a pure silica core and a doped silica cladding will function as a waveguide.

A method according to the present invention for fabricating a fluorine doped silica clad fiber takes advantage of certain merits of the flame hydrolysis process. Thus flame hydrolysis is characterized by a high rate of deposition so large silica preforms can be rapidly grown. The advantages of large preforms is that they can be used to make very long fibers without the need for splices or connections. Also during fiber drawing, the preforms do not have to be replaced so often in the fiber drawing towers so reducing labour costs. Also as described in U.S. Pat. No. 3,459,522 (Elmer) the water content in a porous silica body can be reduced to exceedingly low levels by drying in a chlorine containing atmosphere. Water must be removed from the silica to a level less than 1 ppm otherwise the resulting optical waveguide has high loss and closely spaced repeaters are needed in an optical waveguide transmission line. In the method of the invention there is no critical dependence on dopant entrainment during silica deposition since dopant is introduced after silica deposition is complete.

According to the invention, there is provided a method of manufacturing optical waveguide comprising:
  making a porous pure silica cylindrical rod preform by depositing particulate silica onto a support body,
  making a porous pure silica hollow cylindrical preform by depositing particulate silica onto a second support body,
  drying the preforms in an atmosphere of chlorine and helium,
  heating the hollow cylindrical preform in a fluorine-containing atmosphere to cause diffusion of fluorine into the porous preform,
  putting the cylindrical rod preform into the hollow cylindrical preform,
  heating the preforms to cause consolidation of the porous silica and to cause collapse of the second hollow preform onto the rod preform to form a composite preform,
  heating the composite preform locally to a drawing temperature and,
  drawing optical waveguide from the composite preform, such waveguide having a core part comprising silica derived from the rod preform and a cladding part comprising fluorine doped silica derived from the hollow preform.

Preferably the two preforms are dried individually after preparation thereof and are again dried together after the rod preform is inserted into the tube preform. The preforms can be dried in a chlorine containing atmosphere. The particulate silica is preferably produced by a flame hydrolysis action in which silicon tetrachloride dissociates in an oxygen-hydrogen burner flame.

The rod preform can be deposited on the end of a silica seed rod, the seed rod being progressively axially moved away from the burner flame as the silica is deposited so as to maintain a substantially constant spacing between the burner flame and the end of the rod preform. The tubular preform is preferably deposited on the outside curved surface of a tapered cylindrical carbon mandrel, the mandrel being rotated around its axis as the burner is reciprocated along the length of the mandrel.

In the drying steps the chlorine is preferably mixed with helium, the drying chamber being maintained at a temperature of the order of 1000° C. for several hours. Similarly in the fluorine diffusion step the fluorine gas, for example, sulphur hexafluoride or silicon tetrafluoride, is mixed with helium and a temperature of 1000° C. is maintained for several hours. The drying and fluorine diffusion gases are preferably piped respectively through the drying and diffusion chambers at a rate of about 1 l/min.

The final chlorine drying step can be performed in a furnace which has within it a zone sintering region for substantially raising the temperature of the composite preform above 1000° C. whereby the composite preform need not be removed from the furnace after the final drying step and before consolidating the particulate silica into fused silica.

Figure 2:
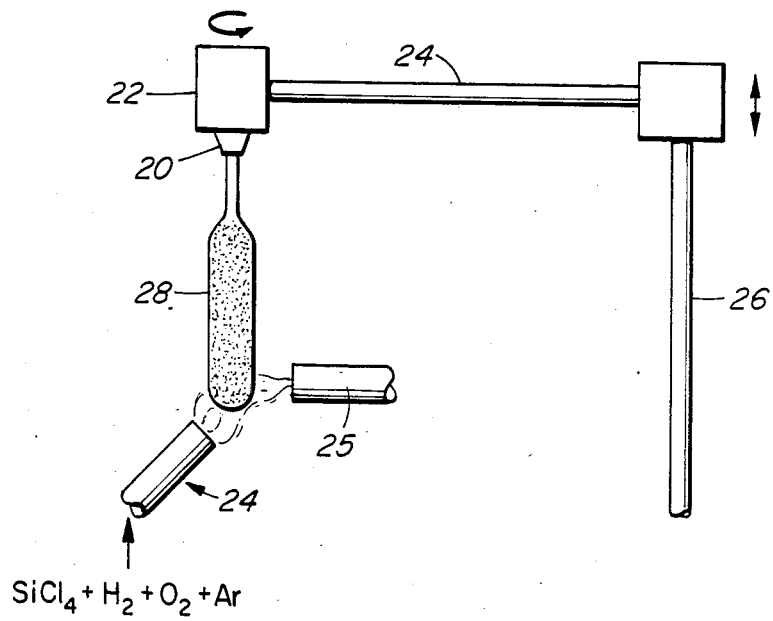
Figure 3:
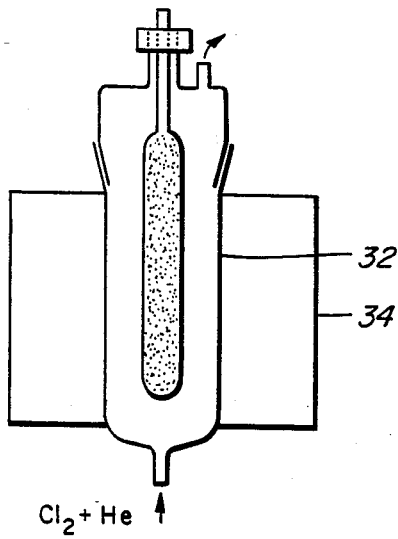
Figure 4:
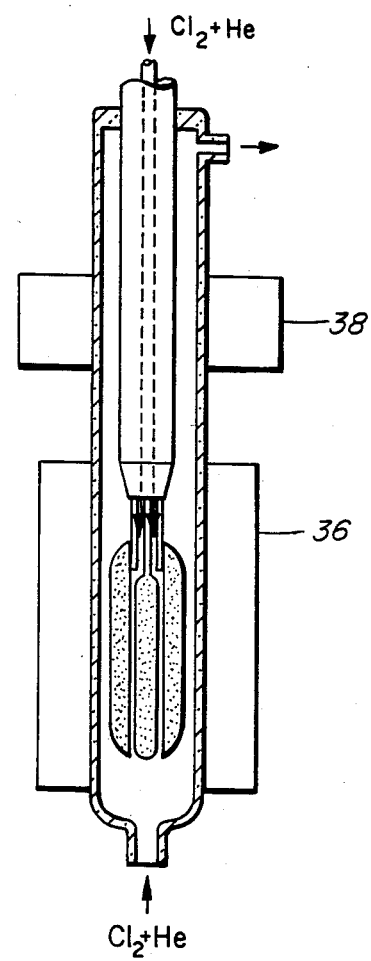

An embodiment of the invention will now be described by way of example with reference to the accompanying drawings in which:
  FIG. 1 is a schematic view of equipment for making a porous tubular silica preform;
  FIG. 2 is a schematic view of equipment for making a porous silica rod preform;
  FIG. 3 is a schematic view of equipment for drying or for diffusing a dopant into a porous silica preform; and
  FIG. 4 is a schematic view of equipment for consolidating a composite preform into fused silica.

Referring to FIG. 1, there is shown a carbon mandrel 10 extending horizontally between two quartz chucks 12. Adjacent to the mandrel and mounted fro reciprocation along a track parallel to the mandrel is a burner 14 to which silicon tetrachloride, hydrogen and oxygen are fed. Silicon tetrachloride entrained within a stream of oxygen is fed to a central chamber within the burner. Argon which separates the silicon tetrachloride vapor from the burner gases within the burner is fed to a second chamber. Hydrogen is fed to a third chamber and a mixture of argon and oxygen is fed to the outer burner chamber. The flow rates are 1.5 l/min of oxygen to the first chamber, 1.2 l/min of argon to the second chamber, 5 l/min of hydrogen to the third chamber and 3 l/min of argon with 1.5 l/min of oxygen to the outer chamber. The mandrel 10 is rotated at 30 rpm and the burner is reciprocated along the length of the mandrel at 8 cm/min. The rate of growth of silica on the outside of the mandrel depends on the size of the mandrel and previously formed particulate silica. Initially using a mandrel with an external diameter of about 1.5 cm the initial growth rate is of the order of 0.5 grams/min, but as the deposition of silica results in a preform having an outer diameter of the order of 8 cm, a silica deposition rate of greater than 2 grams/min can be achieved. Following completion of the preform it is allowed to cool and then removed from the mandrel. The mandrel and the silica contract to different extents during cooling to allow easy removal of the silica from the mandrel. The mandrel can have a slight taper to further aid in preform removal.

Referring now to FIG. 2, the preparation of the cylindrical rod preform is in many respects similar to preparation of the tubular preform. However in contrast to FIG. 1, the rod preform is deposited axially. A silica rod 18 is mounted within a chuck 20 which is rotated at 30 rpm using a motor 22. A burner 24 which is similar in all respects to the burner used in the preparation of the tubular preform is fixed to direct silica upwardly onto the end of the silica seed rod 18. To ensure the formation of a cylindrical rod preform of substantially uniform diameter the burner flame is directed angularly at the end of the seed rod and an air flow around the end of the rod is generated using a pipe 25 connected to a pump (not shown). As particulate silica deposition takes place, the seed rod 18 is progressively raised by moving a supporting jig 24 relative to the support column 26.

Following the preparation of the two preforms, they are dried in chlorine. As shown in FIG. 3 the preform is mounted vertically within a quartz chamber 32 which is itself located within a furnace 34. A mixture of chlorine and helium is then piped through the chamber at a temperature of 1000° C. for 4 hours and at a chlorine and helium flow rate each of 1 l/min. Hydrogen within the preform combines with the chlorine to produce hydrogen chloride. Excess chlorine and hydrogen chloride are exhausted from the chamber leaving chlorine within the particulate silica. The chlorine is too large an atom to stay within the glass matrix in a subsequent sintering step so is driven off as chlorine gas.

In the case of the tubular preform, while it is within the drying chamber it is subsequently subjected to a fluorine atmosphere. A fluorine producing gas such as sulphur hexafluoride or silicon tetrafluoride together with helium is piped through the chamber at a flow rate of 1 l/min for each gas. Again the temperature is raised to 1000° C. for a diffusion time of the order of 4 hours. The effect of heating within the fluorine atmosphere is to introduce fluorine into the silica matrix. However the fluorine atom is substantially smaller than the chlorine atom so in a subsequent sintering step it is not driven out of the silica. In an alternative embodiment of the invention, the silica can be dried in fluorine and in effect the initial drying and fluorine doping steps are performed together. However, the fluorination step produces HF in the presence of water and the HF quickly attacks the quartz furnace elements. Consequently, an HF resistant liner such as amorphous Si or platinum is needed in the furnace.

As shown in FIG. 4, the rod and tube preforms are subsequently taken to a further drying furnace 36 which is combined with a zone sintering furnace 38. The rod preform is mounted concentrically within the tubular preform and within this combined furnace the two preforms are subjected to a final drying step and then to a zone sintering step in which firstly the outer tubular preform collapses onto the inner rod preform and secondly, the particulate material is consolidated into a fused transparent silica. The drying step is again performed in a chlorine-helium atmosphere at 1000° C. for 5 hours. Following completion of drying, the zone sintering furnace raises the temperature of the preforms locally to about 1700° C. when the collapse and consolidation of the particulate material occurs. By ensuring that the zone sintering takes place in the same chamber as the final drying step the opportunity for moisture and contaminants to penetrate the particulate material is reduced. Once the particulate material has been consolidated into a fused silica, then the opportunity for water and other contaminants to penetrate the composite preform obtained is further reduced.

Using the dual drying technique a moisture level of less than 1 ppm in both the core and cladding preforms can be achieved. With the 4 hour fluorine diffusion time indicated previously a refractive index in the cladding material of 1.4530 compared to 1.4585 for silica can be achieved.

The composite preform is subsequently placed in a vertical orientation drawing tower having a furnace zone at which the preform temperature is raised to about 2000° C. which is higher than the silica softening point. Fiber is pulled from the lower end of the preform by a drum onto which the fiber is wound after being cooled and coated with a protective acrylate or silicone layer. The fiber has a high refractive index pure silica core and a relatively low index cladding.

What is claimed is:

1. A method of making an optical waveguide comprising:
    making a porous pure silica cylindrical rod preform by depositing particulate silica onto a support body;
    cooling and then removing the preform rod from the support body;
    making a porous pure silica hollow cylindrical preform by depositing particulate silica onto a second support body;
    cooling the hollow cylindrical preform; and removing the support body;
    drying the preforms;
    heating the hollow cylindrical preform in a fluorine-containing atmosphere to cause diffusion of fluorine thereinto;
    putting the cylindrical rod preform into the hollow cylindrical preform;
    heating the preforms to cause consolidation of the porous silica and to cause collapse of the hollow preform onto the rod preform to form a composite preform;
    heating the composite preform locally to a drawing temperature; and
    drawing an optical waveguide from the composite preform, such waveguide having a core part comprising silica derived from the rod preform and a cladding part comprising fluorine doped silica derived from the hollow preform.

2. A method as claimed in claim 1 in which the hollow cylindrical preform is made by depositing particulate silica obtained from the flame hydrolysis of a silicon halide onto the curved surface of a mandrel and subsequently removing the hollow cylindrical preform from the mandrel upon cooling the preform.

3. A method as claimed in claim 1 in which the rod preform is made by axial deposition of particulate silica obtained from the flame hydrolysis of a silicon halide onto the end surface of a seed rod.

4. A method as claimed in claim 1 in which the steps of deposition of particulate silica comprise chemical vapor deposition of silicon tetrachloride.

5. A method as claimed in claim 1 in which the fluorine is derived from a fluoride gas fed to he hollow cylindrical preform in conjunction with helium gas.

6. A method as claimed in claim 5, in which the fluoride gas is one of the group consisting of sulphur hexafluoride and silicon tetrafluoride.

7. A method as claimed in claim 1 in which following insertion of the rod preform into the hollow cylindrical preform, the rod and hollow cylindrical preforms are subjected to chlorine drying in a first part of a furnace and the subsequent consolidation and collapse is effected in a second higher temperature part of the furnace.

* * * * *